(12) United States Patent (10) Patent No.: US 9,137,025 B2
Lambert (45) Date of Patent: Sep. 15, 2015

(54) MANAGING DATA FOR AUTHENTICATION DEVICES

(75) Inventor: Robert John Lambert, Cambridge (CA)

(73) Assignee: Certicom Corp., Mississauga, ON ( * ) Notice: Subject to any disclaimer, the term of this patent is extended or adjusted under 35 U.S.C. 154(b) by 260 days.

(21) Appl. No.: 13/462,975

(22) Filed: May 3, 2012

(65) Prior Publication Data

US 2012/0284514 A1 Nov. 8, 2012

(30) Foreign Application Priority Data

May 6, 2011 (WO) ................ PCT/CA2011/050278

(51) Int. Cl.
*H04L 9/32* (2006.01)
*H04L 9/08* (2006.01)
*H04L 9/12* (2006.01)
*G06F 21/34* (2013.01)
(Continued)

(52) U.S. Cl.
CPC .............. *H04L 9/3271* (2013.01); *G06F 21/34* (2013.01); *G06F 21/81* (2013.01); *H04L 9/0819* (2013.01); *H04L 9/12* (2013.01); *H04L 9/32* (2013.01); *H04L 9/3263* (2013.01); *H04L 63/0823* (2013.01); *G06F 2221/2103* (2013.01); *G06F 2221/2105* (2013.01); *G06F 2221/2107* (2013.01); *H02J 7/00* (2013.01); *H02J 2007/0001* (2013.01); *H02J 2007/0062* (2013.01); *H02J 2007/0098* (2013.01); *H04M 1/0262* (2013.01)

(58) Field of Classification Search
CPC ............................ H04L 63/08; H04L 63/0428
USPC ....................................... 713/161, 168; 726/2
See application file for complete search history.

(56) References Cited

U.S. PATENT DOCUMENTS 5,661,806 A 8/1997 Nevoux et al.
6,377,691 B1 4/2002 Swift et al.
(Continued)

FOREIGN PATENT DOCUMENTS

CA 2611818 12/2006
CN 101945104 1/2011
(Continued)

OTHER PUBLICATIONS

Battery Authentication and Security Schemes, Texas Instruments, Application Report SLUA346—Jul. 2005, 7 pages.
(Continued)

*Primary Examiner* — Anthony Brown
(74) *Attorney, Agent, or Firm* — Fish & Richardson P.C.

(57) ABSTRACT

Methods, systems, and computer programs for managing authentication data for an authentication device are disclosed. An authentication device may be included, for example, in a mobile device battery so that the battery can be authenticated by a mobile device. In some implementations, encrypted certificate data are stored on an authentication device. The encrypted certificate data are accessed, and unencrypted certificate data are generated by decrypting the encrypted certificate data. The unencrypted certificate data are stored on the authentication device. The unencrypted certificate data enable the authentication device to provide a valid reply message, for example, in response to receiving an interrogation message from an interrogation device. In some implementations, the reply message includes the unencrypted certificate data and a response value generated by the authentication device based on a secret value.

33 Claims, 5 Drawing Sheets

(51) Int. Cl.
  *G06F 21/81*  (2013.01)
  *H04L 29/06*  (2006.01)
  *H04M 1/02*  (2006.01)
  *H02J 7/00*  (2006.01)

(56) References Cited

U.S. PATENT DOCUMENTS

| | | | |
|---|---|---|---|
| 7,194,765 | B2 | 3/2007 | Blom |
| 7,554,288 | B2 | 6/2009 | Gangstoe et al. |
| 7,596,699 | B2 | 9/2009 | Kwok |
| 7,667,429 | B2 | 2/2010 | Little |
| 7,863,858 | B2 | 1/2011 | Gangstoe et al. |
| 8,278,870 | B2 | 10/2012 | Little |
| 8,296,565 | B2 | 10/2012 | Taylor |
| 2003/0055962 | A1 | 3/2003 | Freund et al. |
| 2003/0061519 | A1 | 3/2003 | Shibata et al. |
| 2003/0154355 | A1 | 8/2003 | Fernandez |
| 2004/0066278 | A1 | 4/2004 | Hughes et al. |
| 2005/0001589 | A1 | 1/2005 | Edington et al. |
| 2005/0010782 | A1 | 1/2005 | Ohkubo |
| 2005/0188206 | A1 | 8/2005 | Kwok |
| 2006/0015725 | A1 | 1/2006 | Voice et al. |
| 2006/0117176 | A1 | 6/2006 | Sasaki et al. |
| 2006/0143700 | A1 | 6/2006 | Herrmann |
| 2006/0173943 | A1 | 8/2006 | Luzzi et al. |
| 2006/0204004 | A1 | 9/2006 | Shankar et al. |
| 2006/0205388 | A1 | 9/2006 | Semple et al. |
| 2006/0212701 | A1 | 9/2006 | Warwick |
| 2006/0230436 | A1 | 10/2006 | Holtmanns et al. |
| 2007/0024235 | A1 | 2/2007 | Guthrie |
| 2007/0123304 | A1 | 5/2007 | Pattenden et al. |
| 2007/0123316 | A1 | 5/2007 | Little |
| 2007/0143864 | A1 | 6/2007 | Cabana et al. |
| 2007/0157023 | A1 | 7/2007 | Kotzin |
| 2007/0260892 | A1 | 11/2007 | Paul et al. |
| 2007/0278992 | A1 | 12/2007 | Paul et al. |
| 2008/0024268 | A1* | 1/2008 | Wong et al. ............ 340/5.8 |
| 2008/0091957 | A1 | 4/2008 | Everett et al. |
| 2008/0123863 | A1 | 5/2008 | Bade et al. |
| 2008/0136607 | A1 | 6/2008 | Ratcliff et al. |
| 2008/0159534 | A1 | 7/2008 | Rager et al. |
| 2008/0179401 | A1 | 7/2008 | Hart et al. |
| 2008/0201395 | A1 | 8/2008 | Luzzi et al. |
| 2008/0252477 | A1 | 10/2008 | Howard |
| 2008/0276092 | A1 | 11/2008 | Eberhardt et al. |
| 2009/0055645 | A1 | 2/2009 | Park et al. |
| 2009/0091427 | A1 | 4/2009 | Shiotsu et al. |
| 2009/0096574 | A1 | 4/2009 | Oberle |
| 2009/0113534 | A1 | 4/2009 | Nanda et al. |
| 2009/0206937 | A1 | 8/2009 | Luzzi et al. |
| 2009/0243539 | A1 | 10/2009 | Ganstoe et al. |
| 2009/0256717 | A1 | 10/2009 | Iwai |
| 2009/0265411 | A1 | 10/2009 | Maletsky |
| 2009/0295326 | A1 | 12/2009 | Daynes et al. |
| 2010/0005300 | A1 | 1/2010 | Klotsche |
| 2010/0011218 | A1 | 1/2010 | Shankar et al. |
| 2010/0024029 | A1 | 1/2010 | Sasaki et al. |
| 2010/0026236 | A1 | 2/2010 | Kamiyami et al. |
| 2010/0042824 | A1 | 2/2010 | Lee et al. |
| 2010/0056228 | A1* | 3/2010 | Brown et al. ............ 455/572 |
| 2010/0063932 | A1 | 3/2010 | Camenisch et al. |
| 2010/0148721 | A1 | 6/2010 | Little |
| 2010/0178961 | A1 | 7/2010 | Book et al. |
| 2010/0197367 | A1 | 8/2010 | Pattenden et al. |
| 2011/0078549 | A1 | 3/2011 | Thueringer et al. |
| 2011/0200193 | A1 | 8/2011 | Blitz et al. |
| 2012/0167169 | A1 | 6/2012 | Ge |
| 2012/0213361 | A1 | 8/2012 | Lim et al. |
| 2012/0223671 | A1 | 9/2012 | Seethaler et al. |
| 2012/0239555 | A1 | 9/2012 | Seethaler et al. |
| 2012/0242459 | A1 | 9/2012 | Lambert |
| 2012/0315959 | A1 | 12/2012 | Book et al. |
| 2013/0166909 | A1 | 6/2013 | Agrawal et al. |
| 2014/0153714 | A1 | 6/2014 | Lambert |
| 2014/0156998 | A1 | 6/2014 | Lambert |

FOREIGN PATENT DOCUMENTS

| | | |
|---|---|---|
| EP | 0628935 | 12/1994 |
| EP | 1965539 | 9/2008 |
| EP | 2159731 | 3/2010 |
| JP | 2011135464 | 7/2011 |
| WO | 2007084601 | 7/2007 |
| WO | 2009073969 | 6/2009 |
| WO | 2010057312 | 5/2010 |

OTHER PUBLICATIONS

Atmel, CryptoAuthentication, AT88SA100S, Battery Authentication Chip, Preliminary, Copyright 2009 Atmel Corp. 21 pages.
Darrel Hankerson, Alfred J. Menezes, Scott A. Vanstone, Guide to Elliptic Curve Cryptography, SpringerVerlag, 2004. 332 pages.
International Search Report and Written Opinion issued in International Application No. PCT/CA2011/050438 on Oct. 21, 2011; 9 pages.
International Search Report and Written Opinion issued in International Application No. PCT/CA2011/050278 on Dec. 21, 2011; 8 pages.
Alfred J. Menezes, Paul C. van Oorschot, et Scott A. Vanstone, Handbook of Applied Cryptography—Chapter 1, 49 pages, 1996.
Alfred J. Menezes, Paul C. van Oorschot, et Scott A. Vanstone, Handbook of Applied Cryptography—Chapter 6, 33 pages, 1996.
Alfred J. Menezes, Paul C. van Oorschot, et Scott A. Vanstone, Handbook of Applied Cryptography—Chapter 7, 61 pages, 1996.
Alfred J. Menezes, Paul C. van Oorschot, et Scott A. Vanstone, Handbook of Applied Cryptography—Chapter 8, 38 pages, 1996.
Alfred J. Menezes, Paul C. van Oorschot, et Scott A. Vanstone, Handbook of Applied Cryptography—Chapter 9, 64 pages, 1996.
Alfred J. Menezes, Paul C. van Oorschot, et Scott A. Vanstone, Handbook of Applied Cryptography—Chapter 10, 41 pages, 1996.
Alfred J. Menezes, Paul C. van Oorschot, et Scott A. Vanstone, Handbook of Applied Cryptography—Chapter 11, 65 pages, 1996.
Alfred J. Menezes, Paul C. van Oorschot, et Scott A. Vanstone, Handbook of Applied Cryptography—Chapter 12, 54 pages, 1996.
Alfred J. Menezes, Paul C. van Oorschot, et Scott A. Vanstone, Handbook of Applied Cryptography—Chapter 13, 49 pages, 1996.
International Preliminary Report on Patentability under Chapter I issued in International Application No. PCT/CA2011/050278 on Nov. 21, 2013; 5 pages.
Atmel, Crypto-Authentication, High Level Security Models, Application Note, 8666A-SMIC-03/09, 11 pages, published in Mar. 2009 by Atmel Corporation.
Preneel, Bart & van Oorschot, Paul C.; MDx-MAC and Building Fast MACs from Hash Functions; Appeared in Advances in Cryptology—CRYPTO 1995, Lecture Notes in Computer Science, D. Coppersmith (ed.), Springer-Verlag, 15 pages, 1995.
United States Office Action in U.S. Appl. No. 13/690,996, dated Jun. 23, 2014, 21 pages.
United States Office Action in U.S. Appl. No. 13/691,101, dated Jun. 13, 2014, 26 pages.
United States Office Action in U.S. Appl. No. 13/691,101, dated Nov. 19, 2014, 36 pages.
United States Office Action in U.S. Appl. No. 13/428,605, dated Mar. 24, 2015, 14 pages.
International Preliminary Report on Patentability in International Application No. PCT/CA2011/050438, dated Oct. 10, 2013, 6 pages.
Extended European Search Report in European Application No. 11862495.6, dated Sep. 1, 2014, 6 pages.
Extended European Search Report in European Application No. 11864911.0, dated Sep. 22, 2014, 6 pages.
Communication Pursuant to Article 94(3) EPC in European Application No. 12195164.4, dated Feb. 16, 2015, 5 pages.
U.S. Appl. No. 10/025,873 filed on Dec. 26, 2001.
Canadian Office Action in Canadian Application No. 2,832,348, dated Apr. 1, 2015, 3 pages.

* cited by examiner

MANAGING DATA FOR AUTHENTICATION DEVICES

CROSS-REFERENCE TO RELATED APPLICATIONS

This application claims the benefit of PCT Application Serial No. PCT/CA2011/050278, entitled "Managing Data for Authentication Devices," filed on May 6, 2011, the entire contents of which is hereby incorporated by reference.

BACKGROUND

This specification relates to managing authentication data for an authentication device. Some products can authenticate product accessories to ensure that the accessories are approved by the product manufacturer. For example, some smartphones can authenticate a battery upon installation of the battery, before charging, or at other times. In such cases, authentic batteries that are approved by the smartphone manufacturer include an authentication device that generates data that can be authenticated by the smartphone. The authentication device and other components of the battery are typically manufactured and assembled by multiple different entities during the battery manufacturing process.

BRIEF DESCRIPTION OF THE DRAWINGS

Like reference numbers and designations in the various drawings indicate like elements.

DETAILED DESCRIPTION

Product makers incorporate authentication devices in their products to reduce the potential of counterfeiting. The authentication device contains authentication data (e.g., a secret key value, certificate data, etc.) that can be used to establish the authenticity of the product. Authentication devices are often manufactured and then integrated into an end product. For example, an authentication device for a mobile device battery is typically manufactured by a semiconductor manufacturer, then integrated into a circuit board by a circuit board manufacturer, and the circuit board is then integrated into the mobile device battery by the battery manufacturer. As such, the authentication device may pass through many locations and be handled by multiple different entities before the product is completed or delivered to the product manager.

Complex manufacturing and supply chains can be vulnerable to overproduction and siphoning schemes, in which legitimate products are stolen and redirected to illegitimate (e.g., counterfeit, underground, etc.) markets. For example, legitimate authentication devices could potentially be overproduced and incorporated into counterfeit batteries, and if the overproduced authentication device were operational, the counterfeit battery could be authenticated by the smartphone handset. As another example, legitimate batteries with legitimate authentication devices could potentially be overproduced and sold through underground channels. Counterfeit devices can pose problems for product makers and consumers alike. For example, counterfeit devices may pose safety hazards, exposing companies to litigation as well as displacing genuine products. As another example, a counterfeit device may not perform as expected by the consumer. In some scenarios, overproduction is difficult to prevent, and overproduced devices are difficult to track or detect.

Complex manufacturing and supply chains can also be vulnerable to data security concerns. For example, authentication devices are authenticated based on authentication data (e.g., certificate data, key data, etc.) stored on the authentication device. A malicious party could potentially intercept the authentication data during the manufacturing process and incorporate the authentication data into counterfeit products. For example, authentication devices can utilize public-key cryptography schemes and certificates on the public keys. The private and public keys can be stored on the authentication devices during the manufacturing process, for example, by the authentication device manufacturer. Even if the authentication device manufacturer is trusted, the authentication device may later be incorporated into a subsystem by another manufacturer that is not trusted. As such, in some cases, the product manager is motivated to prevent the authentication device manufacturer from producing valid authentication devices.

In some implementations, the risk of legitimate authentication devices being siphoned away and the risk of valid authentication data being stolen during a manufacturing process is reduced by storing the authentication data in an encrypted format during all or part of the manufacturing process. For example, the authentication data can be communicated to the authentication device manufacturer in an encrypted format, and the authentication device manufacturer can store the encrypted authentication data on the authentication device. The authentication data can be decrypted later in the manufacturing process by another entity. Storing the encrypted authentication data on the authentication device also allows the authentication data to be securely transported through the manufacturing process by the authentication device itself, and reduces the counterfeiter's motivation to siphon legitimate devices. For example, because the authentication data are encrypted, a potential counterfeiter cannot efficiently enable operation of the siphoned authentication device without the cryptographic secret (e.g., the secret key that can be used to decrypt the encrypted authentication data). The cryptographic secret that can decrypt the authentication data may be made accessible only to the product maker or another trusted entity later in the manufacturing process, so that the authentication device is not operational, for example, when it leaves the authentication device maker's facility.

Moreover, some types of manufacturing processes are performed in locations that have unreliable or inadequate data communication capabilities. As such, communicating the authentication data for each of the authentication devices directly to the manufacturing facility may be impractical or inefficient. In some implementations, transporting the authentication data on the authentication device itself helps to ensure that the required information is available at the end product manufacturing site, but not at semiconductor manufacture. For example, the end product manufacturing site may only need to receive the cryptographic key to decrypt the authentication data, rather than receiving the authentication data itself, which can be much larger than the cryptographic key.

As a specific example, the risk of a battery authentication device being redirected to a counterfeit market may be reduced if the battery's authentication device is not operational until later stages of the battery manufacturing process or after manufacturing is complete. Accordingly, to limit the trust required of the semiconductor manufacturer who manufactures the authentication device, encrypted versions of the authentication data (e.g., the certificate on the authentication device's public key) can be provided to the semiconductor manufacturer. In such cases, the semiconductor manufacturer can produce authentication devices that are functional but lack the informational resources needed for authentication by the mobile device. The battery manufacturer who receives the authentication device can later decrypt the authentication data stored on the authentication device.

Figure 1:
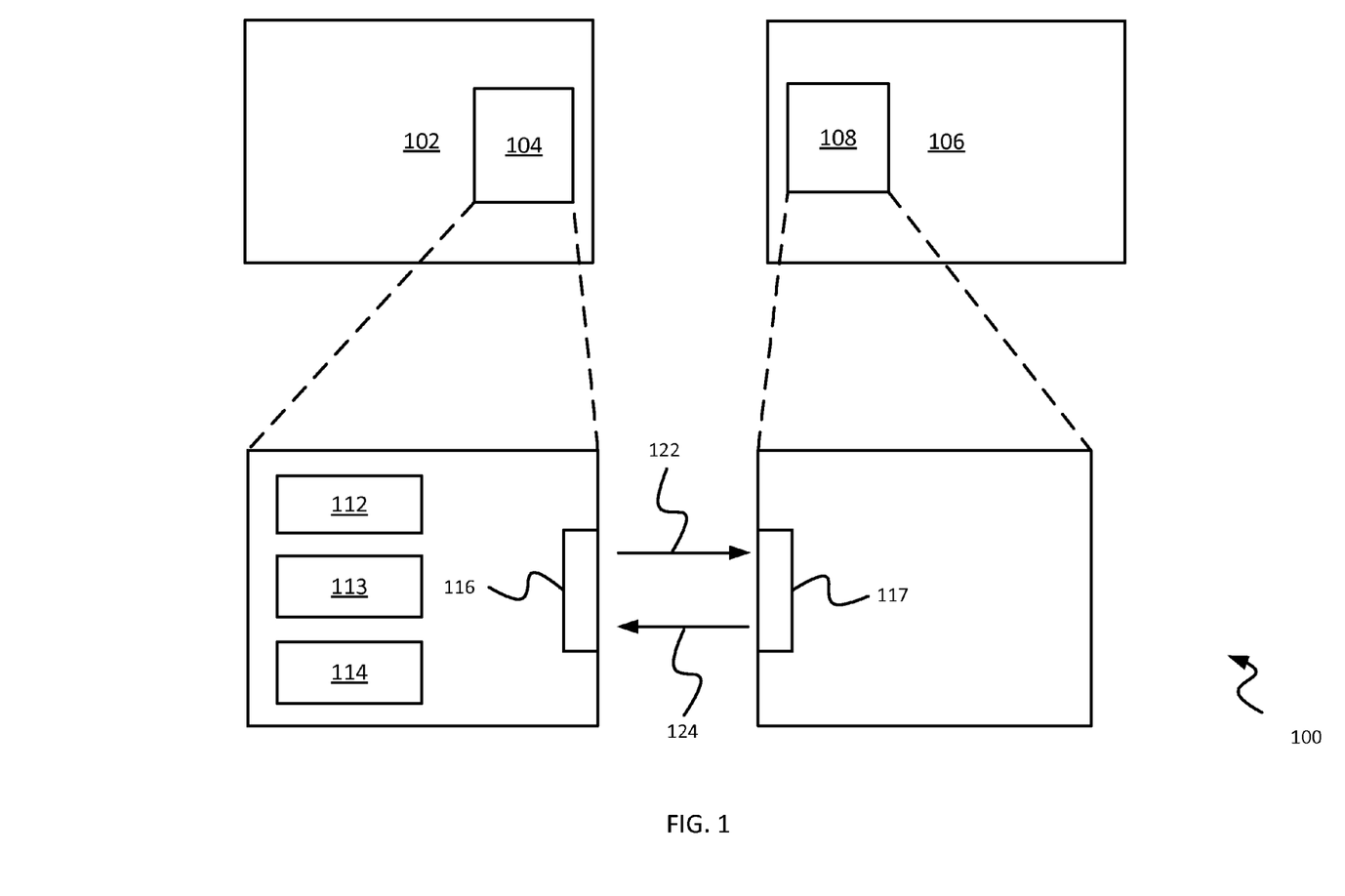
FIG. 1 is a diagram of an example device authentication system.

FIG. 1 is a schematic diagram of an example authentication system 100. The authentication system 100 includes a primary device 106 and a secondary device 102. The primary device 106 includes an interrogator module 108, and the secondary device 102 includes an authentication module 104. The authentication system 100 may include additional or different components, which may be configured as shown and described with respect to FIG. 1, or in a different manner.

The interrogator module 108 can approve or deny authentication of the authentication module 104 based on messages exchanged between the interrogator module 108 and the authentication module 104. For example, the authentication module 104 can be required to prove to the interrogator module 108 that it knows some secret information. In the example shown in FIG. 1, the interrogator module 108 sends interrogation messages 124 to the authentication module 104, and the authentication module 104 sends reply messages 122 to the interrogator module 108. The example interrogation messages 124 include challenge values, and the example reply messages 122 include proffered response values and certificate data. In some implementations, the messages include additional or different types of information. If the authentication module 104 sends the correct response value and a valid certificate, the interrogator module 108 can approve the secondary device 102 that includes the authentication module 104.

Figure 2:
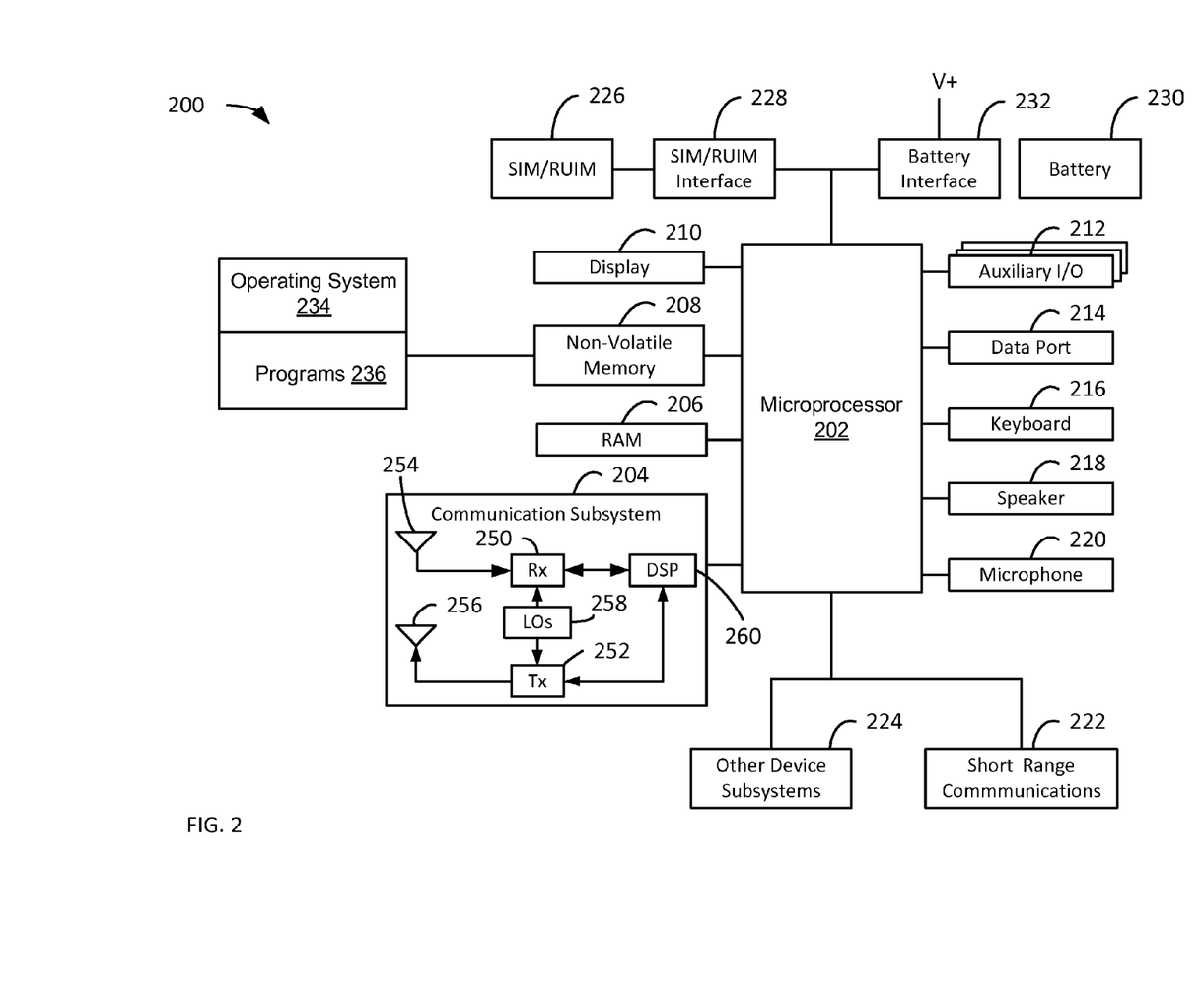
FIG. 2 is a diagram of an example mobile device.

Generally, the primary device 106 and the secondary device 102 can be any type of systems, modules, devices, components, and combinations thereof. In some examples, the primary device 106 can be a mobile device. Examples of mobile devices include various types of cellular devices, smartphones, portable media players, personal digital assistants (PDAs), laptops, notebooks, tablets, etc. FIG. 2 shows a specific example of a primary device and a secondary device. In the example shown in FIG. 2, the primary device is a mobile device 200, and the secondary device is a battery 230. In other examples where the primary device 106 is a mobile device, the secondary device 102 can be a different type of accessory to be paired with the mobile device. For example, the secondary device 102 can be a headset, a charger, a keyboard, a pointing device, a replacement part, or another type of accessory for the mobile device.

The primary device 106 and the secondary device 102 can alternatively be components of another type of system. Examples of other types of primary devices include consumer electronics, computing devices, consumer appliances, transportation systems, manufacturing systems, security systems, pharmaceutical products, medical devices, and others. In some implementations, the primary device 106 is a printer and the secondary device 102 is a cartridge for the printer. In some implementations, the primary device 106 is a badge reader and the secondary device 102 is a badge to be read by the badge reader.

The primary device 106 and the secondary device 102 can communicate through a communication link. Various types of communication links may be used, as appropriate. For example, the primary device 106 and the secondary device 102 may communicate through a wired communication link, such as a USB link, a parallel port link, a voltage terminal, or another type of wired contact. As another example, the primary device 106 and the secondary device 102 may communicate through a wireless communication link, such as a radio frequency link, an infrared link, or another type of wireless medium. The primary device 106 and the secondary device 102 may communicate through a combination of wired and wireless links. The communication link between the primary device 106 and the secondary device 102 can include the communication interface 117 of the interrogator module 108, the communication interface 116 of the authentication module 104, or any combination of these and other communication interfaces.

The interrogator module 108 can be implemented by hardware, software, firmware, or a combination thereof. For example, in some cases, all or part of the interrogator module 108 can be implemented as a software program executed by a microprocessor. As another example, in some cases, all or part of the interrogator module 108 can be implemented as digital or analog circuitry. In some instances, the interrogator module 108 is integrated with and/or utilizes other software or hardware resources of the primary device 106, or the interrogator module 108 can be a standalone module. The interrogator module 108 includes a communication interface 117 that transmits the interrogation messages 124 and receives the reply messages 122. The communication interface 117 can include a wired interface, a wireless interface, or a combination of these.

The interrogator module 108 can include a memory or another type of medium that stores challenge-response data. For example, the interrogator module 108 can include a challenge selector that selects challenge values, and the interrogator module 108 can include a cryptographic function evaluator that derives response values for selected challenge values. As such, the interrogator module 108 can include data regarding one or more previously-derived challenge-response pairs, instructions that allow the interrogator module 108 to derive challenge-response pairs, or other information relating to challenge-response data. In some instances, a random number generator is used to select challenge values and a key-based encryption or signature scheme (e.g., RSA, ECC) is used to derive the response values. The interrogator module 108 may derive response values for challenge values using a cryptographic function. For example, the response value for each challenge value may be generated at the interrogator module 108 based on a public key of the authentication module 104. When the interrogator module 108 interrogates the authentication module 104, the interrogator module 108 obtains a challenge value and provides the challenge value to the authentication module 104 in the interrogation message 124.

The authentication module 104 can be implemented by hardware, software, firmware, or a combination thereof. For example, in some cases, all or part of the authentication module 104 can be implemented as a software program executed by a microprocessor. As another example, in some cases, all or part of the authentication module 104 can be implemented as digital or analog circuitry. In some instances, the authentication module 104 is integrated with and/or utilizes other software or hardware resources of the secondary device 102, or the authentication module 104 can be a standalone module. The authentication module 104 includes a communication interface 116 that transmits the reply messages 122 and receives the interrogation messages 124. The communication interface 116 can include a wired interface, a wireless interface, or a combination of these.

The authentication module 104 includes a response-generator module 112 and authentication data. In the example shown in FIG. 1, the authentication data include key data 113 and certificate data 114. An authentication module may include additional or different types of features, including additional or different types of authentication data. The key data 113 include a secret value that is used by the response-generator module 112 to generate a proffered response value based on a challenge value received from the interrogator module 108. The secret value can be a secret key value of a cryptographic key pair. The cryptographic key pair can be a symmetric or asymmetric key pair. For example, the cryptographic key pair can be a key pair based on ECC, RSA, AES, DES, or another type of encryption scheme. In some instances the key data 113 include one or both of the keys of the cryptographic key pair. For example, the key data 113 may include the private key, the public key, or both the public and private keys of an asymmetric key encryption scheme. The key data 113 may include additional or different types of information.

The response-generator module 112 can generate a response value based on a challenge value received from the interrogator module 108 and the secret value included in the key data 113. For example, the response-generator module 112 can receive a challenge value from the interrogator module 108 and generate a proffered response value. The proffered response value can be generated by evaluating a cryptographic function at the response-generator module 112. In some implementations, the input data for the cryptographic function can include a private key value and a challenge value. In some instances, the response-generator module 112 can generate the proffered response value by applying an encryption or digital signature function to the challenge value provided by the interrogator module 108. For example, the response-generator module 112 may use the private key value to apply a digital signature to the challenge value.

In the example shown in FIG. 1, the certificate data 114 include a digital certificate that certifies a public key value. In some implementations, the public key value certified by the digital certificate corresponds to the private key value used by the response-generator module 112 to generate proffered response values. The certificate data 114 can include an explicit or implicit representation of the public key value, an identification value for the authentication module, a digital signature of a certificate authority, information regarding when the digital certificate was generated, information regarding when the digital certificate expires, information regarding the identity of the certificate authority, or any combination of these and other data elements. The proffered response value and the certificate data 114 can be transmitted to the interrogator module 108 in one or more of the reply messages 122.

In some implementations, digital certificates include one or more of the following features. A digital certificate can be issued by a certificate authority, which is a trusted party that certifies public keys for entities that utilize key-based cryptographic schemes. For example, each authentication device may have a unique identification number and a particular public key value, and a digital certificate can serve as verification from a trusted source that a particular public key value belongs to the authentication device having a particular identification number. As such, the digital certificate can bind the identification value of each authentication device to a particular public key value. Another user entity, such as the interrogator module 108, can use a public key of the certificate authority to verify that the digital certificate was signed by the trusted certificate authority. In this manner, the digital certificate serves as confirmation by the trusted third party that the public key value presented by the authentication module 104 belongs to a legitimate authentication module 104 and not an impostor.

The certificate data 114 can include any type of digital certificate data, including an implicit certificate or an explicit certificate. In some cases, an explicit certificate includes the certificate authority's signature on the public key value certified for the authentication module 104. The explicit certificate can also include the public key value, an identifier of the authentication module 104, and other information. An implicit certificate includes information that can be used to construct the authentication module's public key. As such, some implicit certificates include neither an explicit representation of the public key value nor an explicit representation of the certificate authority's digital signature. For example, the implicit certificate can include a public key reconstruction value, which can be used in combination with other available information (e.g., the certificate authority's public key, etc.) to reconstruct the public key value. An example of an implicit certificate scheme is the ECQV implicit certificate scheme.

In some aspects of operation, the interrogator module 108 generates an interrogation message 124 and sends the interrogation message 124 to the authentication module 104. The interrogation message 124 includes a challenge value. The authentication module 104 receives the interrogation message 124 and generates a reply message 122. The reply message 122 includes the certificate data 114 and a proffered response value. The certificate data 114 and the proffered response value can be sent in a single message or in multiple different messages. The response-generator module 112 generates the proffered response value by evaluating a cryptographic function. In some implementations, the response-generator module 112 uses the secret value in the key data 113 to apply the cryptographic function to the challenge value received from the interrogator module 108. For example, the response-generator module 112 may use a private key value to apply a digital signature to the challenge value.

In some aspects of operation, the interrogator module 108 receives the reply message 122. In response to receiving the reply message 122, the interrogator module 108 validates the certificate data 114. Validating the certificate data 114 indicates that the public key presented by the authentication module 104 is a trusted public key that has been certified by the certificate authority. For example, the interrogator module 108 may use the certificate authority's public key to validate the certificate data 114. The interrogator module 108 can obtain the certificate authority's public key by retrieving the certificate authority's public key from the certificate authority, by accessing the certificate authority's public key from a local memory available to the interrogator module 108, or in another manner. If the certificate data 114 are validated, the interrogator module 108 also compares the proffered response value to the correct response value. Determining that the proffered response value matches the correct response value indicates that the authentication module 104 has the private key corresponding to the trusted public key. If the interrogator module 108 determines that the authentication module has provided a valid reply, the secondary device can be authenticated. In some implementations, a valid reply includes both the valid certificate data 114 and a valid response value generated based on the key data 113. In such cases, both the certificate data 114 and the key data 113 are required to generate a valid response to the interrogation message 124.

FIG. 2 is a schematic diagram of an example mobile device 200. For example, the mobile device 200 can be a BLACK-BERRY® mobile device and/or another type of mobile device. In some implementations, the mobile device 200 is a dual-mode mobile device. The example mobile device 200 in FIG. 2 includes a microprocessor 202, a communication subsystem 204, random access memory (RAM) 206, non-volatile memory 208, a display 210, one or more auxiliary input/output (I/O) devices 212, a data port 214, a keyboard 216, a speaker 218, a microphone 220, a short-range wireless communications subsystem 222, other device subsystems 224, a SIM/RUIM card (i.e., a Subscriber Identity Module or a Removable User Identity Module) 226, a SIM/RUIM interface 228, a rechargeable battery 230, a battery interface 232, and possibly other components. The mobile device 200 may include the same, additional, and/or different features, which may be arranged and/or operate in the manner shown or in a different manner.

The example mobile device 200 is a battery-powered device that includes a battery interface 232 that receives direct current electrical power from one or more rechargeable batteries 230. The battery 230 can be a smart battery with an embedded microprocessor or a different type of battery. The battery interface 232 may be coupled to a regulator (not shown), which may assist the battery 230 in providing power V+ to the mobile device 200. Additionally or alternatively, the mobile device 200 may receive power from an external source (e.g., an alternating current power source, an adapter, a converter, etc.) and/or a different type of internal power source.

The example mobile device 200 shown in FIG. 2 is a two-way communication device having voice and data communication capabilities. The mobile device 200 may communicate over wireless networks, including wireless telecommunication networks, wireless data networks, combined voice and data networks, and/or other types of wireless networks. Thus, the mobile device 200 may communicate over a voice network, such as any of the analog or digital cellular networks, and may also communicate over a data network. Voice and data networks may be implemented as separate communication networks using separate infrastructure, such as base stations, network controllers, etc., or the voice and data networks may be integrated into a single wireless network. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or others.

In the example mobile device 200 shown in FIG. 2, the communication subsystem 204 includes a receiver 250, a transmitter 252, antennae 254 and 256, one or more local oscillators 258, a digital signal processor (DSP) 260 and possibly other features. The antennae 254 and 256 may include antenna elements of a multiple-element antenna, embedded antennae, radio frequency (RF) antennae, and/or other types of antennae. The communication subsystem 204 is used to communicate with the network. The DSP 260 is used to receive and send signals through the receiver 250 and the transmitter 252, respectively, and the DSP 260 provides control information to the receiver 250 and the transmitter 252. For example, the gain levels applied to communication signals in the receiver 250 and the transmitter 252 may be adaptively controlled through automatic gain control algorithms implemented in the DSP 260. Additional and/or different types of control algorithms may be implemented in the DSP 260 to provide more sophisticated control of the communication subsystem 204.

In some implementations, the local oscillator 258 is a single local oscillator that provides a reference signal for the receiver 250 and the transmitter 252, for example, where voice and data communications occur at a single frequency, or closely-spaced sets of frequencies. Alternatively, for example if different frequencies are utilized for voice communications and data communications, the local oscillator 258 may include multiple local oscillators that are used to generate multiple different frequencies corresponding to the voice and data networks. Information, which may include both digital voice and digital data information, can be communicated within the mobile device 200 to and from the communication subsystem 204 through a link or bus between the DSP 260 and the microprocessor 202. The design and configuration of the communication subsystem 204, such as frequency band, component selection, power level, etc., may depend on the communication network in which the mobile device 200 is intended to operate. For example the communication subsystem 204 may be configured for 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

After any required network registration or activation procedures have been completed, the mobile device 200 may send and receive communication signals, including both voice and data signals, over the wireless networks. Signals received by the antenna 254 from the communication network are routed to the receiver 250, which provides signal amplification, frequency down conversion, filtering, channel selection, etc., and may also provide analog to digital signal conversion. Analog to digital conversion of the received signal allows the resulting digital signal to be decoded by the DSP 260. Signals to be transmitted to the network are processed (e.g., modulated, encoded, etc.) by the DSP 260 and are then provided to the transmitter 252 for digital to analog conversion, frequency up conversion, filtering, amplification and transmission to the communication network via the antenna 256.

In some implementations, the mobile device 200 can send and receive communication signals over the wireless network after wireless network registration or activation procedures have been completed. The wireless network registration or activation procedures for the mobile device 200 may vary based on the type of network or networks with which the mobile device 200 operates. Wireless network access for the example mobile device 200 shown in FIG. 2 is associated with a subscriber or user of the mobile device 200. In particular, the SIM/RUIM card 226 in the SIM/RUIM interface 228 identifies the subscriber or user of the mobile device 200. With the SIM/RUIM card 226 in the SIM/RUIM interface 228, a subscriber can access all subscribed services through the wireless network. For example, subscribed services may include web browsing, e-mail, voice mail, Short Message Service (SMS), Multimedia Messaging Services (MMS), and/or others. The SIM/RUIM card 226 in the SIM/RUIM interface 228 communicates with the microprocessor 202 on the mobile device 200. To identify the subscriber, the SIM/RUIM card 226 may include user parameters, such as an International Mobile Subscriber Identity (IMSI) and/or another type of subscriber identifier. The SIM/RUIM card 226 may store additional and/or different subscriber information, including calendar information, call log information, contacts information, and/or other types of information.

Additionally or alternatively, user identification information can also be stored in the non-volatile memory 208.

The data port 214 may include a serial port, a parallel port, and/or another type of connection port. In some implementations, the data port 214 is a Universal Serial Bus (USB) port that includes data lines for data transfer and a supply line that can provide a charging current to charge the battery 230 of the mobile device 200. The mobile device 200 may be manually synchronized with a host system, for example, by connecting the mobile device 200 through the data port 214 (e.g., in an interface cradle and/or another type of wired connection) that couples the mobile device 200 to a data port of a computer system or other device. The data port 214 may also be used to enable a user to set preferences through an external device or software application, or to download other programs for installation. The wired connection of the data port 214 may be used to load an encryption key onto the device, which may be more secure method than exchanging encryption information via the wireless network.

The short-range communications subsystem 222 provides for communication between the mobile device 200 and different systems or devices, without the use of the wireless network. For example, the short-range communications subsystem 222 may include an infrared or radio frequency device and associated circuits and components for short-range communication. Examples of short-range communication standards include standards developed by the Infrared Data Association (IrDA), BLUETOOTH®, the 802.11 family of standards developed by IEEE, and others.

The microprocessor 202 manages and controls the overall operation of the mobile device 200. Many types of microprocessors or microcontrollers may be used. Additionally or alternatively, a single DSP 260 may be used to carry out one or more functions of the microprocessor 202. Low-level communication functions, including data and voice communications, may be performed through the DSP 260 in the communication subsystem 204. High-level communication applications, such as voice communication applications, data communication applications, and/or other types of software applications may be stored in the non-volatile memory 208 for execution by the microprocessor 202. The microprocessor 202 also interacts with other device subsystems, such as the display 210, the RAM 206, the auxiliary input/output (I/O) devices 212, the data port 214, the keyboard 216, the speaker 218, the microphone 220, the SIM/RUIM interface 228, the battery interface 232, the short-range communications subsystem 222, and any other device subsystems generally designated as 224.

The non-volatile memory 208 includes erasable persistent storage, for example, flash memory, battery-backed-up RAM, and/or other types of memory. In the example shown in FIG. 2, the non-volatile memory 208 stores instructions and data associated with an operating system 234, programs 236 that provide various types of functionality for the mobile device 200, and other types of information. The non-volatile memory 208 may include a file system to facilitate storage of data items on the device. For example, the operating system 234, the programs 236, and/or other modules executed on the microprocessor 202 may store, retrieve, modify, delete, and/or otherwise manipulate data by accessing (e.g., read, write, etc.) the file system provided on the non-volatile memory 208.

Data stored in the non-volatile memory 208 and/or other computer-readable media on the mobile device 200 may include user application data, text files, image files, voicemail data, and other data generated by the user at the mobile device 200 or received and stored by the mobile device 200. The user application data may include, for example, e-mail message data, address book data, contact information data, calendar appointment data, instant message data, SMS message data, voicemail data, user-entered data, and/or other types of application data. Voicemail data may include digitized audio recordings and/or stub entries available for viewing in a messaging application indicating the availability of a voicemail message stored at another location. User-entered data may include text-based, graphic, or other multimedia files loaded onto the mobile device 200 by the user.

The operating system 234 controls low-level functions of the mobile device 200 and facilitates operation of the programs 236. For example, the operating system 234 may provide an interface between one or more of the programs 236 and one or more hardware components on the mobile device 200. The programs 236 include computer program modules that can be executed by the microprocessor 202 (and/or the DSP 260 in some instances). In some implementations, one or more of the programs 236 are executed by the microprocessor 202 and provide a high-level interface between a user and the mobile device 200. The user interface provided by a program 236 typically includes a graphical component provided through the display 210, and may additionally include an input/output component provided through the auxiliary I/O devices 212, the keyboard 216, the speaker 218, and/or the microphone 220. The operating system 234, specific device applications or programs 236, or parts thereof, may be temporarily loaded into a volatile store, such as RAM 206, for faster operation. Moreover, received communication signals may also be temporarily stored to RAM 206 before they are permanently written to a file system in the non-volatile memory 208.

The programs 236 stored in the non-volatile memory 208 may include, for example, a message application, a calendar application, one or more third party applications, and other types of applications. The programs 236 may include additional or different modules, programs, or applications, such as, for example, a Personal Information Manager (PIM) module, a connect module, a device state module, an IT policy module, a multi service platform manager, and/or others. The programs 236 may include programs that control basic device operations, which would typically be installed on the mobile device 200 during its manufacture and/or initial configuration. Other types of software applications, such as, for example, third party applications and/or other types of modules, may be added after the manufacture and initial configuration of the mobile device 200. Examples of third party applications include games, utilities, internet applications, etc. Generally, any of the programs 236 may be updated and/or modified at any time. The additional applications and/or updates to applications can be loaded onto the mobile device 200 through the wireless network, the auxiliary I/O devices 212, the data port 214, the short-range communications subsystem 222, or any other suitable device subsystem 224. The non-volatile memory 208 may also store keys, which may include encryption and decryption keys and addressing information for use in communicating between the mobile device 200 and servers.

The non-volatile memory 208 can include an interrogator module. For example, the interrogator module can be implemented as a software module that is executed by the microprocessor 202. The interrogator module can include the features and attributes of the interrogator module 108 of FIG. 1, or a different type of interrogator module. The interrogator module of the mobile device 200 can communicate with accessories of the mobile device 200, for example, to authenticate the accessories. In some instances, the interrogator module authenticates the battery 230, the SIM card and/or other internal or external components or devices associated with the mobile device 200. As such, the battery 230, the SIM card and/or other internal or external components or devices may include an authentication module, such as the authentication module 104 of FIG. 1 or a different type of authentication module.

In some examples, the battery 230 includes an authentication module that communicates with the interrogator module by voltage-modulated signals transmitted through a terminal of the battery interface 232. For example, the battery 230 may send the microprocessor 202 an authentication request, receive a challenge message from the microprocessor 202, and send the microprocessor 202 a reply message by voltage-modulated signals transmitted through the battery interface 232. The microprocessor 202 can convert the voltage-modulated signals from the battery 230 to messages that can be processed by the interrogator module. Similarly, the microprocessor 202 can convert the messages from the interrogator module to voltage-modulated signals that are transmitted to the battery 230.

Figure 3:
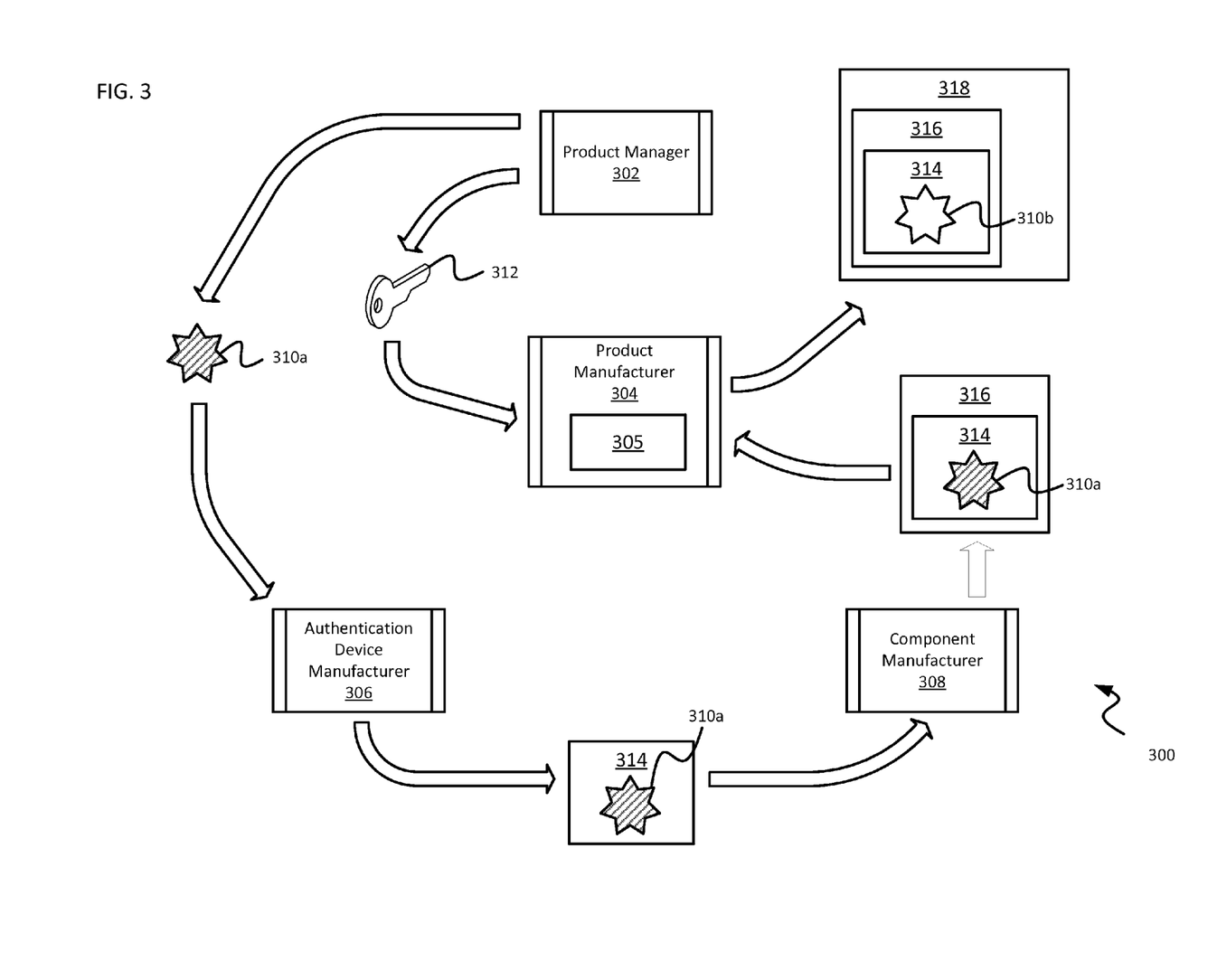
FIG. 3 is a diagram of an example manufacturing process.

The schematic diagram in FIG. 3 illustrates example techniques for managing authentication data for the authentication device during the manufacturing process 300. The manufacturing process 300 may include the same, additional or different operations performed in the order shown or in a different order. The manufacturing process 300 can be used for manufacturing any number of identical, similar, or diverse types of products. For example, the manufacturing process 300 can be used for mass production, customized production, and other types of production. The product 318 can include a single component, or the product 318 can include multiple product components in addition to the product component 316 shown.

Implementations of the example manufacturing process 300 may include various conventional manufacturing techniques and sub-processes that are not specifically shown or described. For example, various implementations of the manufacturing process 300 may include material processing operations, fabrication operations, assembly operations, formatting operations, build operations, and other types of manufacturing operations. A particular example of a product that can be manufactured by the example manufacturing process 300 is a mobile device battery. Although certain aspects of the manufacturing process 300 are described with respect to the particular example of a mobile device battery, the manufacturing process 300 can be utilized for any other type of product that includes or otherwise utilizes an authentication device. Examples of other types of products include other types of accessories or components for mobile devices, printing systems, imaging systems, gaming systems, and others.

As shown in FIG. 3, the manufacturing process 300 involves operations and interactions of multiple entities: a product manager 302, an authentication device manufacturer 306, a product manufacturer 304, and a component manufacturer 308. The product manager 302 is concerned with the secure production of the product 318 by the product manufacturer 304. In some implementations, the product manager 302 is a contracting company, and the product manufacturer 304 is the contracted manufacturer.

The product manufacturer 304 employs the component manufacturer 308 to produce components of the product 318. In some implementations, the product manufacturer 304 is the contracted manufacturer (contracted by the product manager 302), and the component manufacturer 308 is a sub-contracted manufacturer. For example, where the product 318 is a mobile device battery, the product manager 302 can be the mobile device company that distributes the mobile device batteries, the product manufacturer 304 can be the battery manufacturer, the authentication device manufacturer 306 can be a semiconductor manufacturer, and the component manufacturer 308 can be a circuit manufacturer. The component manufacturer 308 or the authentication device manufacturer 306 may implement a lower level of information security assurance, for example, than the product manufacturer 304.

In some implementations, the product manager 302 provides product specifications to the product manufacturer 304, and the product specifications include specifications regarding the authentication device 314. The authentication device manufacturer 306 produces the authentication device 314, which is incorporated into the product 318 at the product manufacturer 304. The product manager 302 may not fully trust one or more of the authentication device manufacturer 306, the component manufacturer 308, the product manufacturer 304. As such, the product manager 302 may not want the authentication device manufacturer 306 to be able to produce a functioning version of the authentication device 314 without approval from the product manager 302. Moreover, the product manager 302 does not want the product manufacturer 304 to be able to overproduce a valid product 318. Similarly, the product manager 302 does not want the authentication device manufacturer 306 or the component manufacturer 308 to be able to divert valid authentication devices to counterfeit markets.

In the example shown in FIG. 3, encrypted authentication data 310a are delivered to the authentication device manufacturer 306. The authentication device 314 may have a serial number or other identifying information. The identifying information and authentication data are injected into the authentication device 314 by the authentication device manufacturer 306. The authentication device manufacturer 306 can inject a complete set of authentication data (e.g., private key, public key, certificate, etc.) into the authentication device 314. All or part of the injected authentication data can include the encrypted authentication data 310a. The injected authentication data can also include authentication data that are not encrypted. The encrypted authentication data 310a can include encrypted key data (e.g., an encrypted public key value, an encrypted private key value, or both), encrypted certificate data, or any other type of authentication data in an encrypted format. For example, the encrypted authentication data 310a may include an encrypted version of all or part of the key data 113 or the certificate data 114 shown in FIG. 1. In some instances, the product manager 302 may trust the authentication device manufacturer 306 to produce the encrypted authentication data 310a, and in some instances the product manager 302 may wish to produce such encrypted material by itself or by another party.

Decryption data 312 are delivered to the product manufacturer 304. For example, the decryption data 312 can be delivered over a secure communication channel, by courier, or by another secure information distribution scheme. Because the decryption data 312 are typically smaller in size than the authentication data, the amount of data transferred to the product manufacturer 304 may be substantially less than the amount of authentication data on the authentication device 314. In some examples, the decryption data 312 can be delivered to the product manufacturer 304 by a low-speed secure communication technique. The decryption data 312 include the information needed to decrypt the encrypted authentication data 310a. For example, the decryption data 312 may include a secret key value. As another example, if the authentication data include a certificate (such as an ECQV implicit certificate) that is reconstructable from a secret value, then the decryption data 312 may include the secret value needed to reconstruct the certificate.

The authentication device manufacturer provides the authentication device 314 to the component manufacturer 308. The component manufacturer 308 manufactures the component 316, which includes the authentication device 314. The component manufacturer 308 provides the component 316 to the product manufacturer 304. In the example shown in FIG. 3, the authentication data stored on the authentication device 314 includes the encrypted authentication data 310a before the authentication device 314 is provided to the product manufacturer 304. As such, the authentication device 314 does not have the information resources need to generate a valid reply message before the authentication device 314 is provided to the product manufacturer 304.

The product manufacturer 304 utilizes an information management system 305 to decrypt the encrypted authentication data 310a based on the decryption data 312. Decrypting the encrypted authentication data 310a generates unencrypted authentication data 310b, which is then stored on the authentication device 314. The encryption and decryption of the authentication data can be carried out, for example, based on a symmetric encryption scheme (e.g., AES, triple-DES, etc.), an asymmetric encryption scheme (e.g., ECC, RSA, etc.), or another type of encryption scheme. The number of decryption keys utilized can be determined by the product manager 302. For example, the product manager 302 can allocate one or more decryption keys to a given product manufacturer 304 for a given period of time.

The information management system 305 generally includes a computing system that can securely store the decryption data 312 and decrypt the encrypted authentication data 310a. For example, the information management system 305 can include a hardware security module (HSM), or another type of computing device with cryptographic capabilities. The information management system 305 can include an information storage sub-system and information processing sub-system. The information storage sub-system can include a memory or another type of computer-readable medium that stores the decryption data 312 in a secure manner. The information processing sub-system can include data processing apparatus that performs decryption operations, for example, by evaluating a cryptographic function. In some instances, the information management system 305 implements some or all of the process 500 shown in FIG. 5, or another technique for managing authentication data. In some implementations, some or all of the information management system 305 is implemented by the product manager 302 or another entity other than the product manufacturer 304. For example, instead of or in addition to providing the decryption data 312 to the product manufacturer 304, the product manager 302 can retain the decryption data 312. In such cases, all or part of the encrypted authentication data 310a can be decrypted by an information management system 305 at the product manager 302. The information management system 305 may also retain log information on which authentication devices have been activated. The log information may be secured with the secure hardware associated with the authentication management system 305. The log information may be made available for audit by the product manager 302.

The information management system 305 can access the encrypted authentication data 310a stored on the authentication device 314, generate the unencrypted authentication data 310b by decrypting the encrypted authentication data 310a, and store the unencrypted authentication data 310b on the authentication device 314. The information management system 305 can include a communication interface adapted to access information stored on the authentication device 314. For example, the authentication device 314 may include an interface such as the communication interface 116 of FIG. 1, and the information management system 305 can include a module adapted to communicate with the communication interface 116 or another interface of the authentication device. As another example, the information management system 305 may include a battery interface (e.g., similar to the battery interface 232 of the mobile device 200 in FIG. 2) adapted to communicate with a mobile device battery.

In the example shown in FIG. 3, the product manufacturer 304 manufactures the product 318 using the component 316 received from the component manufacturer 308. The information management system 305 can then store the unencrypted authentication data 310b on the authentication device 314, and the manufactured product 318 can be provided to the product manager 302. Because the product 318 includes an authentication device 314 having a complete set of unencrypted authentication data when it leaves the product manufacturer 304, the product 318 can be authenticated by an interrogator. For example, the authentication device 314 can generate a valid reply message upon interrogation by an interrogation device. In some implementations, the product 318 is incorporated into another product, sold individually, or disposed of in another manner.

In some aspects of the example shown in FIG. 3, the authentication device 314 can provide a communication pathway for the encrypted authentication data 310a. In some implementations, only part of the authentication data are encrypted. For example, the encrypted authentication data 310a may include only the certificate authority's signature on the certificate data, and additional non-encrypted authentication may be stored on the authentication device 314 by the authentication device manufacturer 306. In some cases, encrypting less than all of the authentication data increase efficiency and provides information that can be used for tracking and control of the authentication device 314 without allowing the authentication device 314 to be used.

Figure 4:
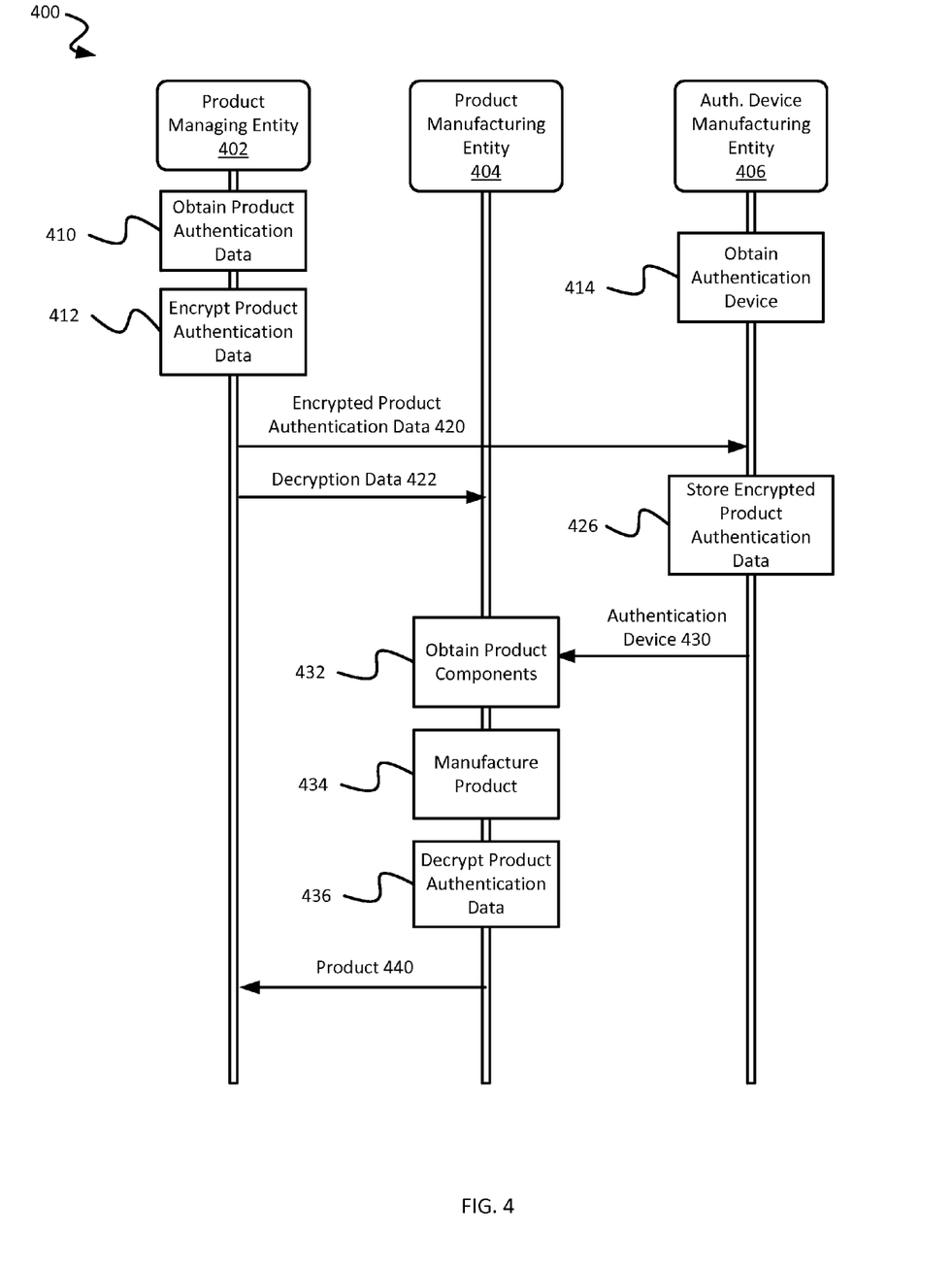
FIG. 4 is a flow diagram showing an example technique for managing authentication data during a manufacturing process.

FIG. 4 is a flow diagram showing an example process 400 for managing authentication data during a manufacturing process. Generally, the process 400 may be implemented in connection with any type of manufacturing process. For example, the process 400 may be implemented as part of the manufacturing process 300 shown in FIG. 3, or as part of a different type of manufacturing process.

The example process 400 is described with regard to manufacturing a product that includes multiple components, and the components are provided by component manufacturing entities. For example, the product can be a mobile device battery or another type of accessory for a mobile device. In the example of a mobile device battery, the product components can include battery cells, a battery console, a battery interface, a battery chip, a battery authentication device, or any combination of these and other components of a mobile device battery. In some implementations, the process 400 can be adapted for use in connection with manufacturing of other types of products or generally any article of manufacture. For example, the product can be a battery or another type of component for an electronic device, an appliance, a vehicle, a computing system, a consumer product, etc. The process 400 may include the same, additional, or different operations performed in the order shown, and/or in a different order. One or more of the operations may be repeated, iterated, or omitted, as appropriate in various implementations. In some implementations, one or more of the operations in the process 400 is iterated, for example, until a terminating condition is reached.

The example process 400 shown in FIG. 4 includes operations performed by three example entities involved in a manufacturing process. The first entity is the product managing entity 402 that is responsible for the product. The second entity is the product manufacturing entity 404 that is responsible for manufacturing the product and providing the manufactured product to the product managing entity 402. The third entity is the component manufacturing entity 406 who is responsible for providing a product component to the manufacturing entity 404. The component provided by the component manufacturing entity 406 includes an authentication device. For example, the component manufacturing entity 406 may provide the authentication device as an individual component, or the component manufacturing entity 406 may provide a component that includes the authentication device. The process 400 may be implemented by a different number of entities, including additional or different types of entities, as appropriate in various manufacturing processes.

At 410, the product managing entity 402 obtains product authentication data. For example, the product authentication data may include certificate data, key data, or another type of authentication data. In some implementations, obtaining the product authentication data includes generating certificate data or receiving certificate data from a certificate authority. In some implementations, obtaining the product authentication data includes deriving one or more values relating to a key pair or receiving one or more key pair values from a cryptographic module.

At 412, the product managing entity 402 encrypts the product authentication data. In some implementations, another entity encrypts the product authentication data. For example, the product authentication data may be encrypted when they are obtained at 410. The product authentication data can be encrypted using a key-based cryptographic scheme. For example, the product authentication data may be encrypted according to a symmetric encryption scheme, an asymmetric encryption scheme or another type of scheme. As such, the encrypted authentication data can be decrypted using a private key value, or another type of decryption data. At 420, the encrypted product authentication data are sent to the component manufacturing entity 406.

At 422, the decryption data are sent to the product manufacturing entity 404. The decryption data may include, for example, a secret value (e.g., a private key value) that can be used to decrypt the encrypted product authentication data, an identification of the encryption scheme used to encrypt the product authentication data (at 412), the parameters of the encryption scheme used, or a combination of these and other data. For example, if the product authentication data are encrypted at 412 by an ECC encryption scheme using a public key value, the decryption data sent at 422 may include the private key value (that corresponds to the public key value) and an identification of the ECC parameters used for the encryption. In some instances, the decryption data are transmitted over a secure communication channel or otherwise securely transported to the product manufacturing entity 404.

At 414, the component manufacturing entity 406 obtains an authentication device. For example, the component manufacturing entity 406 may manufacture the authentication device, receive the authentication device from another entity, or obtain the authentication device in another manner. At 426, the component manufacturing entity 406 stores the encrypted product authentication data on the authentication device. For example, the encrypted product authentication data may be stored in a memory or another type of computer-readable medium of the authentication device. The encrypted product authentication data may then be transported or communicated by transporting the authentication device itself.

At 432, the product manufacturing entity 404 obtains product components to be included in the product. The product components may include components manufactured by the product manufacturing entity 404, components manufactured by the component manufacturing entity 406, or components manufactured by any combination of these and other entities. In the example shown in FIG. 4, the product manufacturing entity 404 obtains the authentication device from the component manufacturing entity 406. For example, the product manufacturing entity 404 may obtain a product component, such as a printed circuit board or another type of component, that includes the authentication device, or the product manufacturing entity 404 may obtain the authentication device as an individual component.

At 434, the product manufacturing entity 404 manufactures the product. The product may be manufactured by any type of manufacturing process or related operations. Some manufacturing processes include, for example, fabricating, building, formatting, or assembling components. Generally, manufacturing processes can include any combination of these and other types of manufacturing operations and sub-processes. Manufacturing processes may be performed in one or more locations by a single entity or by multiple different entities.

At 436, the product manufacturing entity 404 decrypts product authentication data stored on the authentication device. For example, the product authentication data that were encrypted at 412 and stored on the authentication device at 426 can be decrypted at 434. The product authentication data can be decrypted using the decryption data received at 422. Storing the decrypted product authentication data on the authentication device can enable the authentication device to generate a valid reply message. For example, some authentication devices are configured to provide a reply message in response to receiving an interrogation message from an interrogation device, and the authentication device accesses or otherwise uses the authentication data to provide the reply message. Without the unencrypted authentication data, the authentication device may lack the informational resources (e.g., key data, certificate data, etc.) needed to provide a reply message that can be authenticated by the interrogation device. At 440, the product manufacturing entity 404 provides the product to the product managing entity 402.

Figure 5:
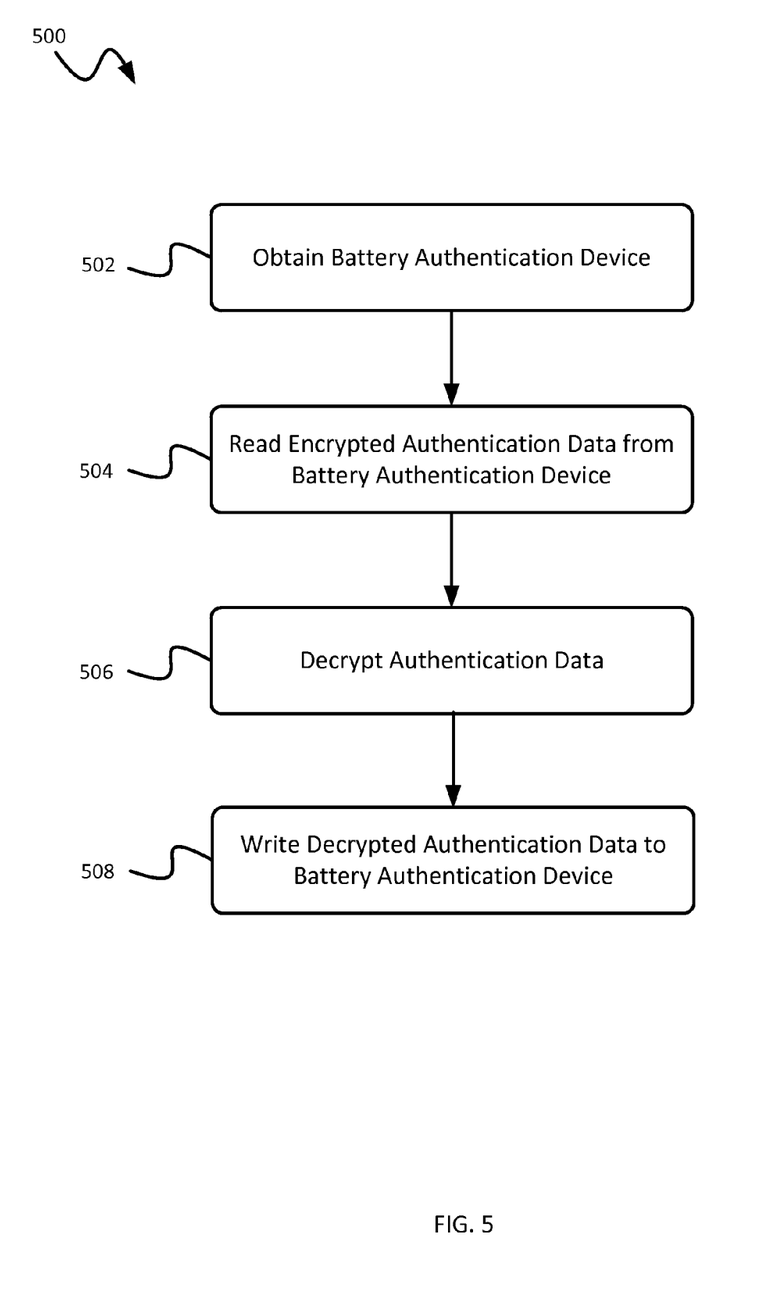
FIG. 5 is a flow chart showing an example process for managing authentication data.

In some implementations of the process 400 shown in FIG. 4, all or part of the decrypting operation (at 436) may be performed using the process 500 shown in FIG. 5. Although the decrypting operation 436 in FIG. 4 is performed by the product manufacturing entity 404 after the product has been manufactured, all or part of the decrypting operation may be performed at other times and by other entities. For example, the product managing entity 402 may decrypt all or part of the authentication data. As another example, all or part of the authentication data may be decrypted after the manufacturing process has been completed, for example, after the product has reached a packaging facility, a distributor facility, a retail location, or an end user.

In some implementations of the process 400 shown in FIG. 4, the same encrypted product authentication data can be stored on multiple different authentication devices. For example, the product managing entity 402 can obtain (at 410) a single product authentication data set to be used with multiple different authentication devices. In such cases, the product authentication data set can be encrypted (at 412) and sent (at 420) to the authentication device manufacturing entity 406, and the encrypted authentication data set can then be stored on multiple different authentication devices (at 426).

In some implementations of the process 400 shown in FIG. 4, different authentication data sets are encrypted using the same encryption scheme. For example, the product managing entity 402 can obtain (at 410) different authentication data sets for different authentication devices, and the product managing entity 402 can encrypt (at 412) all of the different authentication data sets using the same encryption key. In such cases, the encrypted authentication data sets can be sent (at 420) to the authentication device manufacturing entity 406, and each of the encrypted authentication data sets can be stored (at 426) on a different authentication device.

Accordingly, in some implementations of the process 400 shown in FIG. 4, the same decryption data may be used to decrypt the product authentication data stored on multiple different authentication devices. For example, the decryption data can be sent (at 422) to the product manufacturing entity 404 and then used to decrypt (at 436) the authentication data stored on multiple different authentication devices. In some implementations, the encrypted authentication data, the decryption data, or both are only used in relation to a single device.

FIG. 5 is a flow chart showing an example process 500 for managing authentication data for an authentication device. The process 500 may be used to manage authentication data for a battery authentication device as described below. The process 500 may also be implemented with other types of authentication devices. For example, an authentication device for another type of product, component, or object of manufacture may be substituted for the battery authentication device in the process 500. The process 500 may include the same, additional, or different operations performed in the order shown, and/or in a different order. One or more of the operations may be repeated, iterated, or omitted as appropriate.

In a particular example, the process 500 may be performed as part of a manufacturing process. The process 500 may be performed apart from a manufacturing process. For example, all or part of the process 500 may be implemented as a part of a packaging or shipping process, as a part of initializing or using a mobile device or a mobile device battery, or in connection with other types of processes. As such, the process 500 can be implemented in various types of contexts. For example, all or part of the process 500 can be implemented at a manufacturing facility, at a packaging facility, at a testing facility, at a shipping facility, at a retail location, at locations where the battery authentication device is used or installed, or in a combination of these and other locations. Accordingly, some or all of the operations in the process 500 may be performed in the same location or in multiple different locations.

At 502, a battery authentication device is obtained. For example, the battery authentication device can be the authentication module 104 of FIG. 1, or another type of authentication device. The battery authentication device may be part of a mobile device battery or another type of battery. For example, the mobile device battery can be the battery 230 of FIG. 2 or another type of battery.

When the battery authentication device is obtained at 502, the battery authentication device contains encrypted authentication data. For example, the authentication device may include any type of memory or computer-readable medium that stores the encrypted authentication data. When the battery authentication device is obtained at 502, the authentication device may include additional (non-encrypted) authentication data in addition to the encrypted authentication data. The encrypted authentication data may include, for example, certificate data, public key data, private key data, cryptographic function data, and/or other types of information.

The encrypted authentication data are authentication data that have been encrypted by any type of encryption scheme. For example, the authentication data may be encrypted by a key-based encryption scheme, including symmetric schemes, asymmetric schemes, and possibly other types of schemes. Examples of symmetric key schemes include AES, DES, and others. Examples of asymmetric key schemes include RSA, ECC, and others. A secret value may be required to decrypt the encrypted authentication data. For example, in some implementations the authentication data has been encrypted by an ECC scheme using a particular public key value, and the corresponding private key value is needed to decrypt the authentication data efficiently.

The authentication data that are encrypted on the authentication device include authentication data that the battery authentication device uses to provide a valid reply message when the battery is interrogated. As such, as long as the battery authentication device can only access the encrypted authentication data, the battery authentication device cannot provide a valid reply message upon interrogation. For example, if the authentication device cannot access unencrypted certificate data, then the authentication device cannot provide a reply message that includes a valid certificate. As another example, if the authentication device cannot access unencrypted key data, then the authentication device cannot generate a valid response value for a challenge value received from an interrogator.

At 504, the encrypted authentication data are read from the battery authentication device. The encrypted authentication data may be read by a device or system external to both the battery authentication device and the mobile device battery. For example, an information management system may extract the encrypted authentication data from the battery authentication device. In some implementations, the encrypted authentication data are read from a memory of the battery authentication device through an interface of the mobile device battery. All or part of the encrypted authentication data can be preserved on the battery authentication device when the encrypted authentication data are read. All or part of the encrypted authentication data can be deleted from the battery authentication device when the encrypted authentication data are read.

At 506, the encrypted authentication data are decrypted. Decrypting the encrypted authentication data generates unencrypted authentication data. The authentication data are decrypted using the decryption scheme corresponding to the encryption scheme used to encrypt the data. For example, the authentication data may be decrypted by a key-based encryption scheme. To the extent that a secret value (e.g., a secret key for a key-based encryption scheme) is needed for the decryption scheme, the secret value may be received separately from the battery authentication device. For example, the secret value may be delivered from a different source over a secure channel, and the secret value may be stored by an information management system.

At 508, the decrypted authentication data are written to the battery authentication device. The decrypted authentication data can replace all or part of the encrypted authentication data on the battery authentication device. In some implementations, the encrypted authentication data can be preserved on the battery authentication device after the unencrypted authentication data has been written. Writing the decrypted authentication data to the battery authentication device enables the authentication device to provide a valid reply message when the battery is interrogated. In some cases, writing unencrypted certificate data to the battery authentication device may allow the authentication device to provide a reply message that includes a valid certificate. As another example, writing unencrypted key data to the battery authentication device may allow the authentication device to generate a valid response value for a challenge value received from an interrogator. In some implementations, the operations 504, 506, and 508 may be performed in an iterative fashion, where each iteration reads, decrypts, and writes a different block or segment of the authentication data.

The unencrypted authentication data can include at least part of the informational resources that the authentication device uses to generate a valid response when a mobile device interrogates the battery associated with the authentication device. For example, when the battery is coupled to a mobile device, the mobile device can interrogate the battery. If the battery authentication device provides a valid response to the interrogation, the mobile device can approve the battery for use. If the battery authentication device does not provide a valid response, the mobile device can reject the battery. For example, the mobile device may reject the battery for all purposes of battery use, the mobile device may reject the battery for all purposes other than a limited range of mobile device functionality (e.g., making emergency calls, etc.), or the mobile device may take another action. In some instances, the mobile device may report the rejected or non-authenticated battery to a trusted source.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect of the present disclosure, encrypted authentication data are decrypted and stored on an authentication device. In some cases, the encrypted authentication data are accessed from the authentication device and replaced by the unencrypted authentication data, for example, to enable an operational aspect of the authentication device.

In some aspects, encrypted authentication data are stored on an authentication device. Unencrypted authentication data are generated by decrypting the encrypted authentication data. The unencrypted authentication data are stored on the authentication device to enable authentication device to provide a valid reply message. The authentication device is configured to generate the valid reply message in response to receiving an interrogation message from an interrogation device.

Implementations of these and other aspects may include one or more of the following features. The authentication data include certificate data. The authentication device is enabled during a manufacturing process. The manufacturing process includes receiving the authentication device having the encrypted certificate data stored thereon. The manufacturing process includes associating the authentication device with a particular article of manufacture prior to generating the unencrypted certificate data. The article of manufacture includes a mobile device component configured to be interfaced with a mobile device. The mobile device includes the interrogation device. The mobile device component includes a mobile device battery. The valid reply message includes the unencrypted certificate data and a proffered response value. The authentication device is configured to generate the proffered response value based on evaluating a cryptographic function using a secret value stored on the authentication device. The valid reply message further includes additional certificate data stored on the authentication device and not included in the unencrypted certificate data. A decryption key is received independent of accessing the encrypted certificate data. The encrypted authentication data are decrypted using the decryption key. The unencrypted certificate data include implicit certificate data.

In some aspects, encrypted authentication data stored on an authentication device associated with a mobile device battery are accessed. The mobile device battery is configured to provide electrical power to a mobile device and to receive an interrogation message from the mobile device. Unencrypted authentication data for the authentication device are generated by decrypting the encrypted authentication data. The unencrypted authentication data are stored on the authentication device associated with the mobile device battery. Storing the unencrypted authentication data on the authentication device enables the authentication device to provide a valid reply message in response to receiving the interrogation message from the mobile device.

Implementations of these and other aspects may include one or more of the following features. The authentication device is configured to generate a proffered response value based on a private key value associated with a public key value. The authentication device is configured to include the proffered response value in the valid reply message. The unencrypted authentication data include all or part of the private and/or public key data. The authentication device is configured to include certificate data in the valid reply message. The certificate data certify the public key value corresponding to the private key that is used to generate the proffered response value. The unencrypted authentication data include all or part of the certificate data. The unencrypted certificate data include all or part of an implicit certificate or an explicit certificate. The implicit certificate is an ECQV implicit certificate. The unencrypted certificate data include a public key reconstruction value of the implicit certificate.

Additionally or alternatively, implementations of these and other aspects may include one or more of the following features. A decryption key is received independent of accessing the encrypted authentication data, and the encrypted authentication data are decrypted using the decryption key. The decryption key is used to decrypt the encrypted authentication data according to a symmetric encryption scheme, an asymmetric encryption scheme, or a combination. The unencrypted authentication data are stored on the mobile device battery before the mobile device battery is coupled to the mobile device. The unencrypted authentication data are stored on the authentication device during a battery manufacturing process. The battery manufacturing process includes receiving, at a first manufacturing entity, the authentication device previously manufactured by a second manufacturing entity. The authentication device received from the second manufacturing entity has the encrypted certificate data stored thereon. The battery manufacturing process includes associating, at the first manufacturing entity, the authentication device with the mobile device battery.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for managing authentication data for an authentication device associated with a mobile device component, the method comprising:
accessing, at a manufacturing entity, encrypted authentication data stored on an authentication device associated with a mobile device component, wherein the mobile device component is configured to provide electrical power to a mobile device and to receive an interrogation message from the mobile device;
generating, at the manufacturing entity, unencrypted authentication data for the authentication device by decrypting the encrypted authentication data; and
storing, at the manufacturing entity, the unencrypted authentication data on the authentication device associated with the mobile device component, wherein storing the unencrypted authentication data on the authentication device enables the authentication device to provide a valid reply message in response to receiving the interrogation message from the mobile device.

2. The method of claim 1, wherein the encrypted authentication data include encrypted certificate data, the unencrypted authentication data include unencrypted certificate data, and the valid reply message provided by the authentication device includes the unencrypted certificate data.

3. The method of claim 2, wherein the unencrypted certificate data included in the reply message certify a public key value, and the valid reply message provided by the authentication device further includes a proffered response value generated by the authentication device using a private key value associated with the public key value.

4. The method of claim 2, wherein the unencrypted certificate data include a public key reconstruction value of an Elliptic Curve Qu-Vanstone (ECQV) implicit certificate.

5. The method of claim 1, further comprising receiving a decryption key independent of accessing the encrypted authentication data, wherein the encrypted authentication data are decrypted using the decryption key.

6. The method of claim 5, wherein the decryption key is used to decrypt the encrypted authentication data according to a symmetric encryption scheme.

7. The method of claim 5, wherein the decryption key is used to decrypt the encrypted authentication data according to an asymmetric encryption scheme.

8. The method of claim 1, wherein the unencrypted authentication data are stored on the mobile device component before the mobile device component is coupled to the mobile device.

9. The method of claim 1, wherein enabling the authentication device to provide a valid reply message comprises enabling the authentication device during a component manufacturing process.

10. The method of claim 9, wherein the component manufacturing process comprises:
receiving, at a first manufacturing entity, the authentication device previously manufactured by a second manufacturing entity, wherein the authentication device received from the second manufacturing entity has the encrypted authentication data stored thereon; and
associating, at the first manufacturing entity, the authentication device with the mobile device component.

11. A non-transitory computer-readable medium storing instructions that are operable when executed by data processing apparatus to perform operations for managing authentication data, the operations comprising:
accessing, at a manufacturing entity, encrypted authentication data stored on an authentication device associated with a mobile device component wherein the mobile device component comprises an interface configured to provide electrical power to a mobile device and to receive an interrogation message from the mobile device;
generating, at the manufacturing entity, unencrypted authentication data for the authentication device by decrypting the encrypted authentication data; and
storing, at the manufacturing entity, the unencrypted authentication data on the authentication device associated with the mobile device component, wherein the unencrypted authentication data enable the authentication device to provide a valid reply message in response to receiving the interrogation message from the mobile device.

12. The computer-readable medium of claim 11, wherein the encrypted authentication data include encrypted certificate data, the unencrypted authentication data include unencrypted certificate data, and the valid reply message provided by the authentication device includes the unencrypted certificate data.

13. The computer-readable medium of claim 12, wherein the unencrypted certificate data included in the reply message certify a public key value, and the reply message provided by the authentication device further includes a proffered response value generated by the authentication device using a private key value associated with the public key value.

14. The computer-readable medium of claim 11, wherein the valid reply message includes certificate data and a proffered response value, the authentication device is configured to generate the proffered response value based on a private key value, and the unencrypted authentication data include at least a portion of the private key value.

15. The computer-readable medium of claim 12, wherein the unencrypted certificate data include a portion of an implicit certificate.

16. The computer-readable medium of claim 11, the operations further comprising receiving a decryption key independent of accessing the encrypted authentication data, wherein the encrypted authentication data are decrypted using the decryption key.

17. A system for managing authentication data for mobile device components, the system comprising:
an information management device configured to perform operations comprising:
accessing, at a manufacturing entity, encrypted authentication data stored on an authentication device of a mobile device component, the mobile device component comprising a mobile device interface configured to provide electrical power to a mobile device and to receive an interrogation message from the mobile device;
generating, at the manufacturing entity, unencrypted authentication data by decrypting the encrypted authentication data; and
enabling, at the manufacturing entity, the authentication device to provide a valid reply message by storing the unencrypted authentication data on the authentication device, wherein the authentication device is configured to provide the valid reply message in response to receiving the interrogation message.

18. The system of claim 17, wherein the encrypted authentication data include encrypted certificate data, the unencrypted authentication data include unencrypted certificate data, and the valid reply message provided by the authentication device includes the unencrypted certificate data.

19. The system of claim 18, wherein the unencrypted certificate data included in the reply message certify a public key value, and the valid reply message provided by the authentication device further includes a proffered response value generated by the authentication device using a private key value associated with the public key value.

20. The system of claim 17, wherein the information management device stores a decryption key used to decrypt the encrypted authentication data.

21. The system of claim 17, further comprising the mobile device.

22. A method for managing authentication data for an authentication device, the method comprising:
   accessing, at a manufacturing entity, encrypted certificate data stored on an authentication device;
   generating, at the manufacturing entity, unencrypted certificate data by decrypting the encrypted certificate data; and
   enabling, at the manufacturing entity, the authentication device to provide a valid reply message by storing the unencrypted certificate data on the authentication device, wherein the authentication device is configured to provide a valid reply message in response to receiving an interrogation message.

23. The method of claim 22, wherein enabling the authentication device to provide a valid reply message comprises enabling the authentication device during a manufacturing process.

24. The method of claim 23, wherein the manufacturing process comprises:
   receiving the authentication device having the encrypted certificate data stored thereon; and
   associating the authentication device with a particular article of manufacture prior to generating the unencrypted certificate data.

25. The method of claim 24, wherein the article of manufacture includes a mobile device component configured to be interfaced with a mobile device.

26. The method of claim 25, wherein the mobile device component comprises a mobile device component.

27. The method of claim 22, wherein the valid reply message includes the unencrypted certificate data and a proffered response value, and the authentication device is configured to generate the proffered response value based on evaluating a cryptographic function using a secret value stored on the authentication device.

28. The method of claim 27, wherein the valid reply message further includes additional certificate data stored on the authentication device and not included in the unencrypted certificate data.

29. The method of claim 22, further comprising receiving a decryption key independent of accessing the encrypted certificate data, wherein the encrypted authentication data are decrypted using the decryption key.

30. The method of claim 22, wherein the unencrypted certificate data include implicit certificate data.

31. The method of claim 1, wherein the mobile device component comprises a mobile device battery.

32. The computer-readable medium of claim 11, wherein the mobile device component comprises a mobile device battery.

33. The system of claim 17, wherein the mobile device component comprises a mobile device battery.

* * * * *